Feb. 16, 1932.  P. S. SHIELD  1,845,817
SELECTIVE SAFETY TANK VALVE MECHANISM
Filed March 20, 1926  8 Sheets-Sheet 1
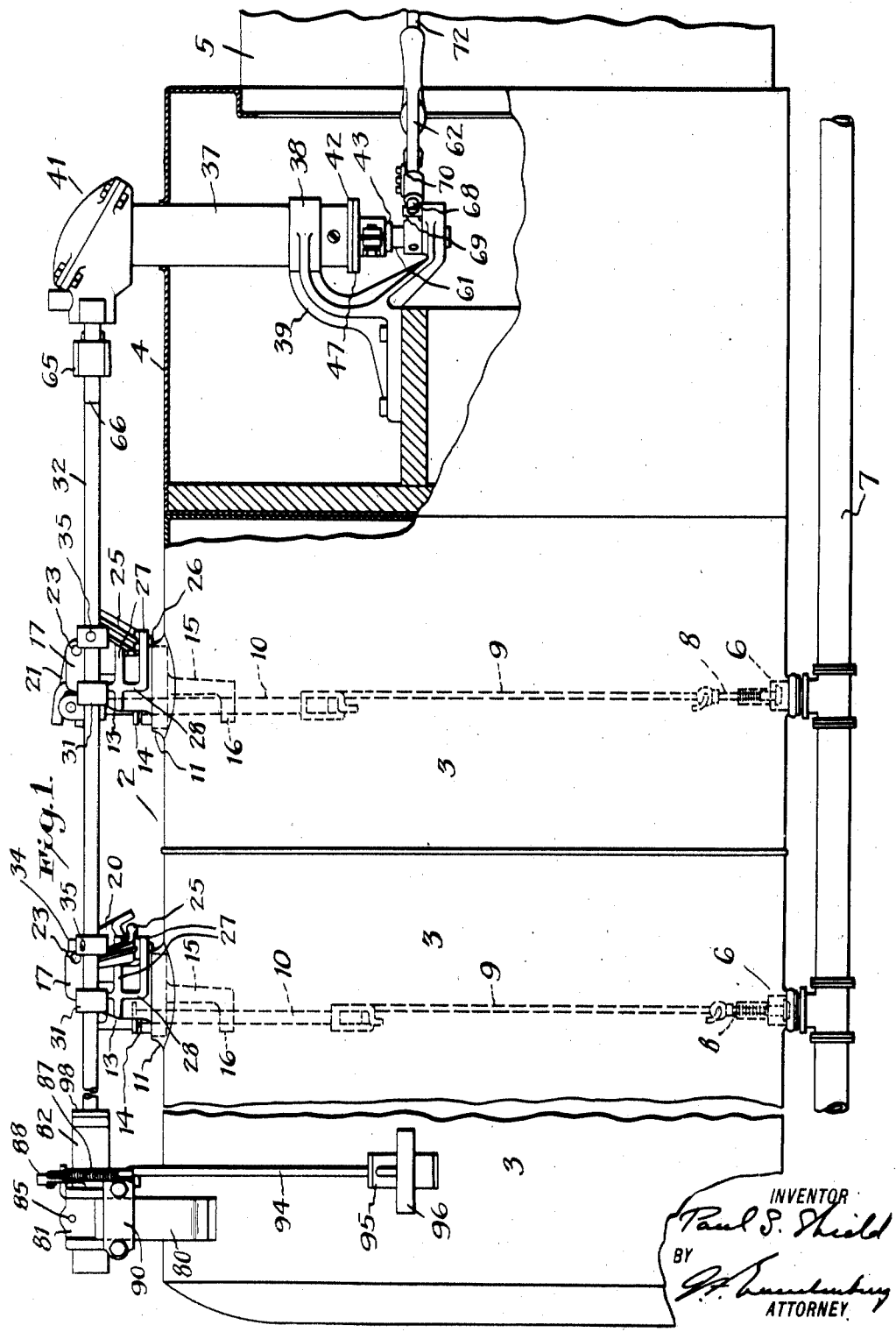
INVENTOR
Paul S. Shield
BY
ATTORNEY

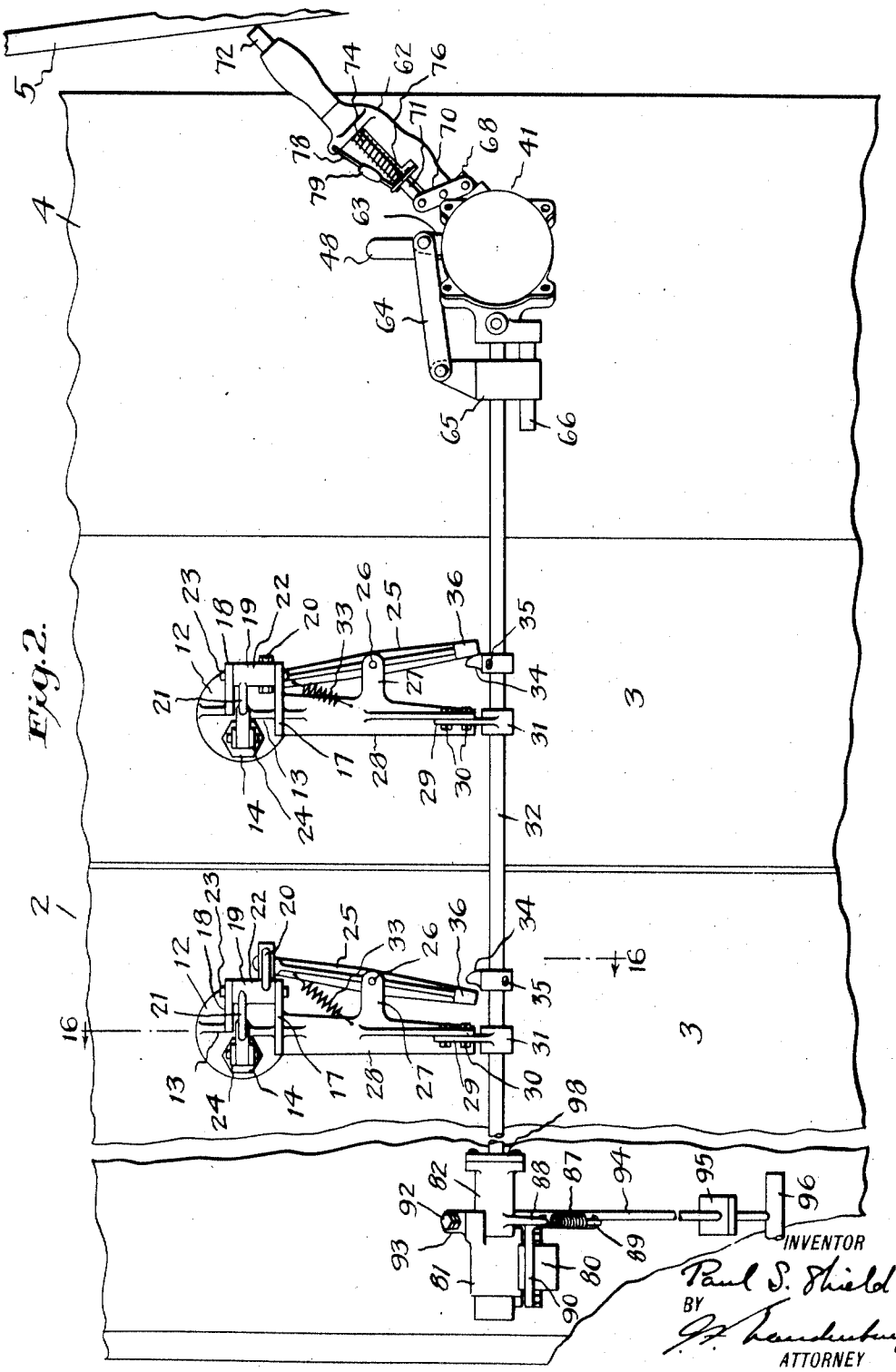

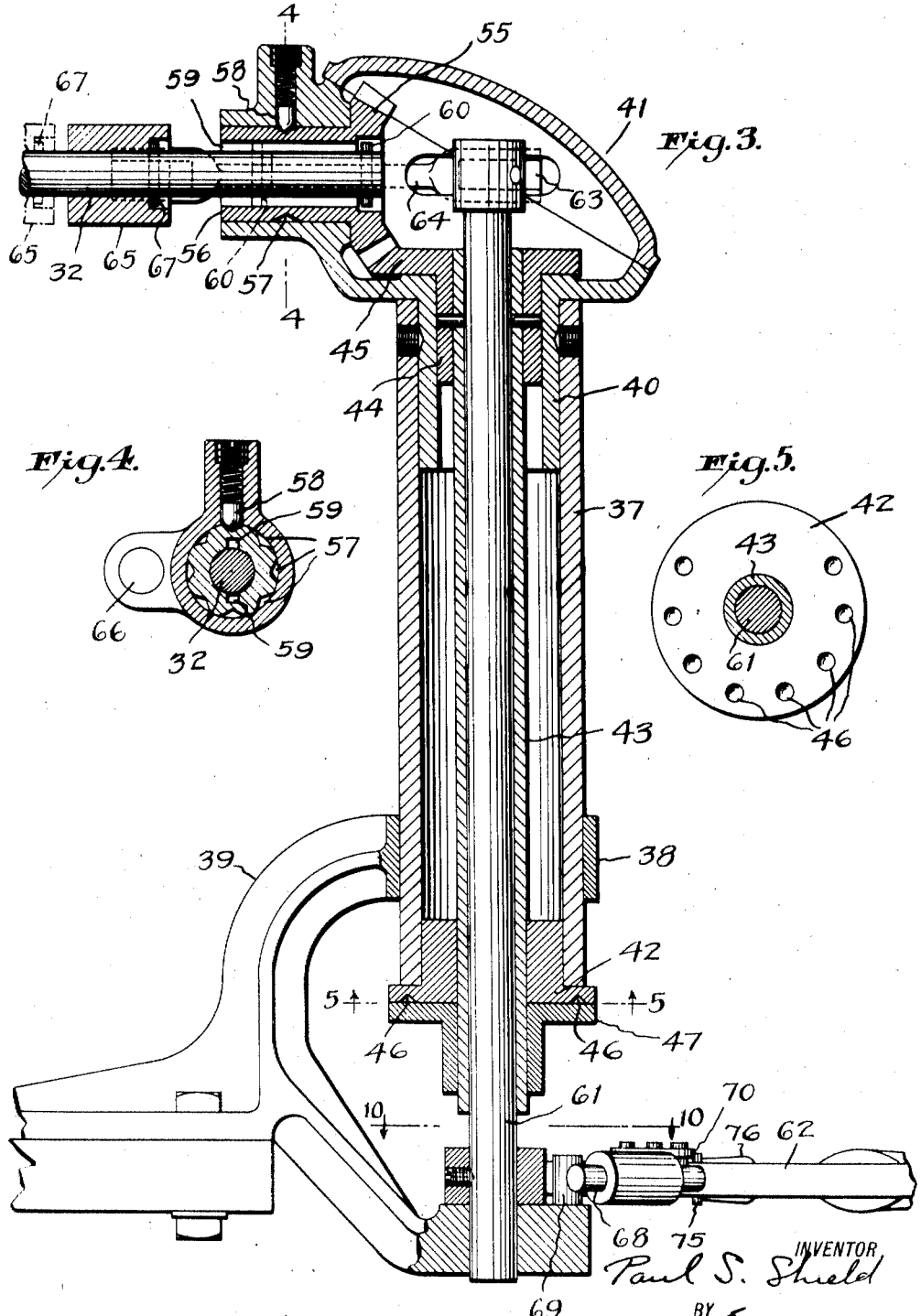

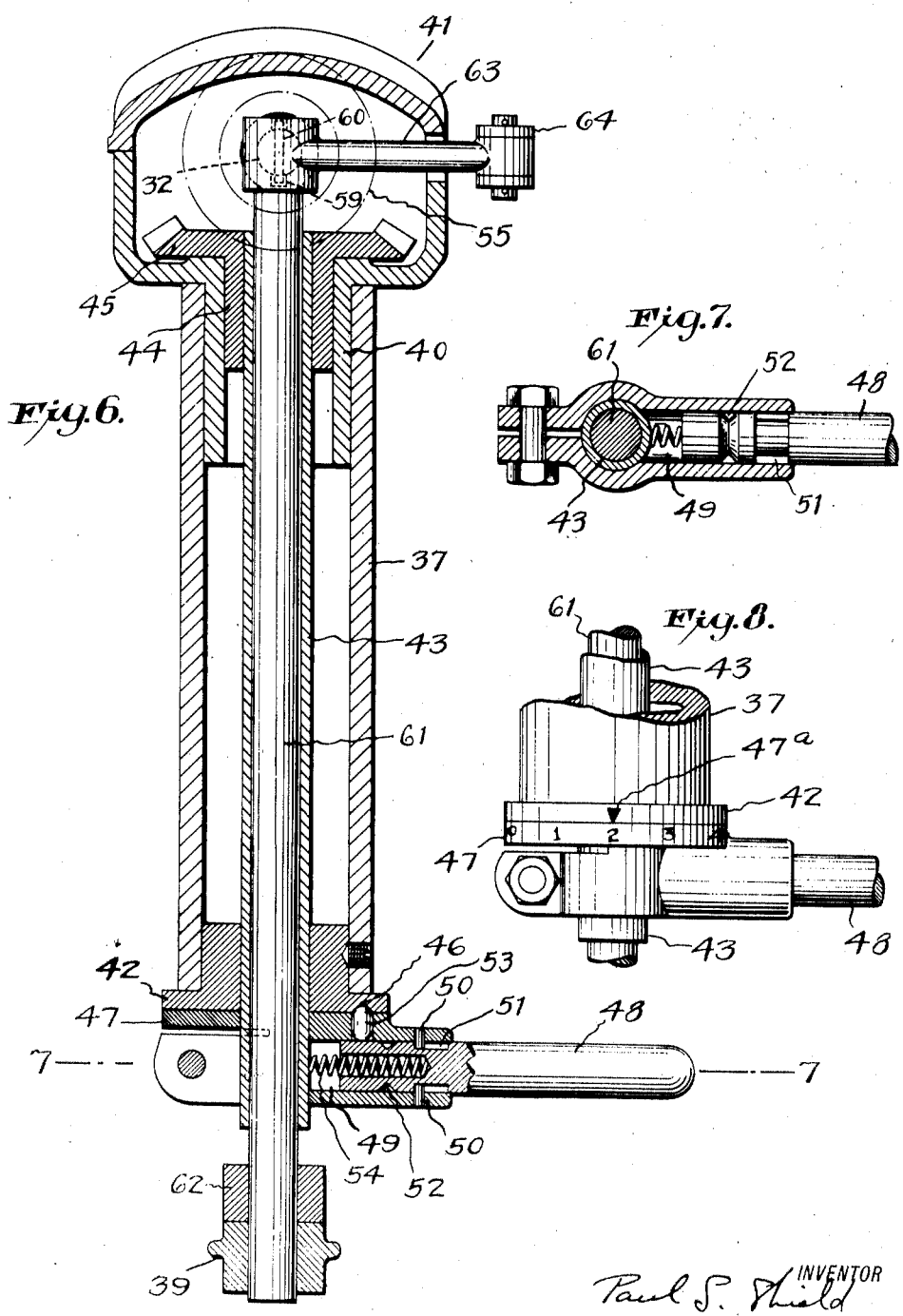

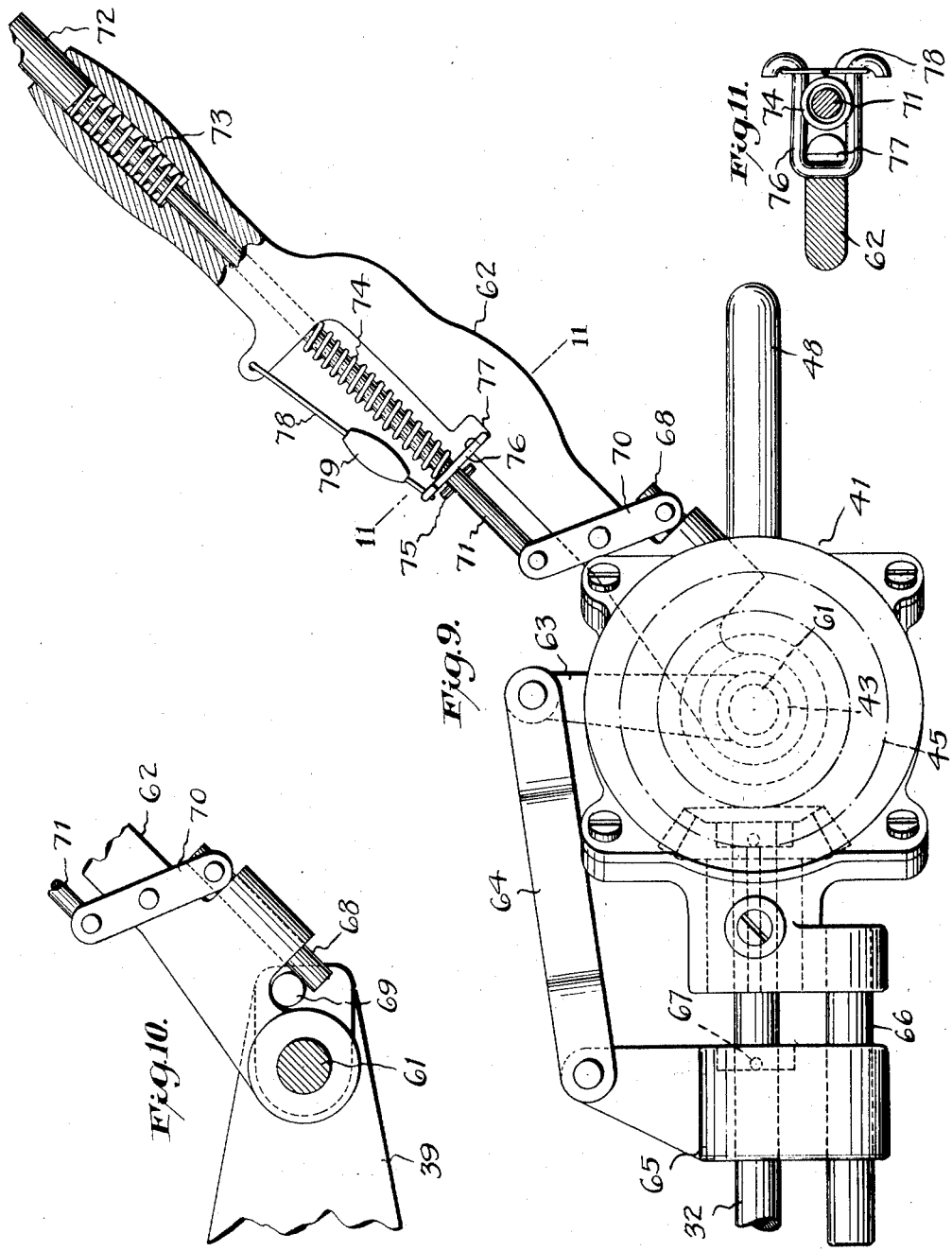

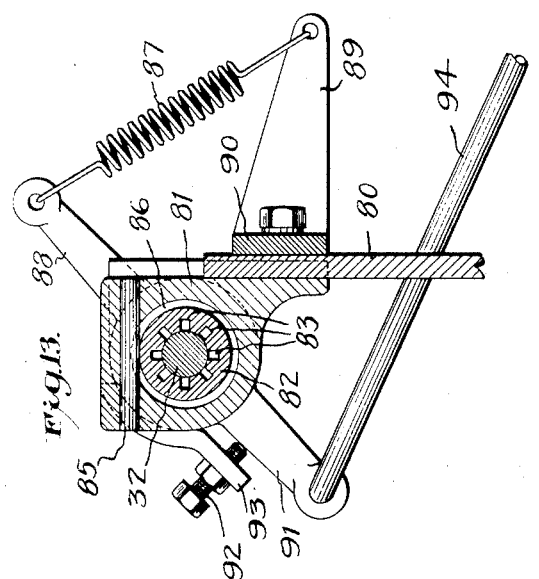
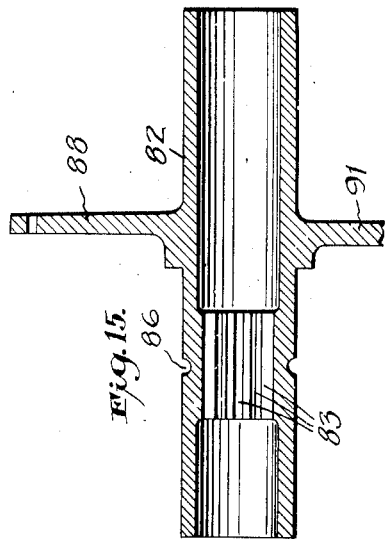
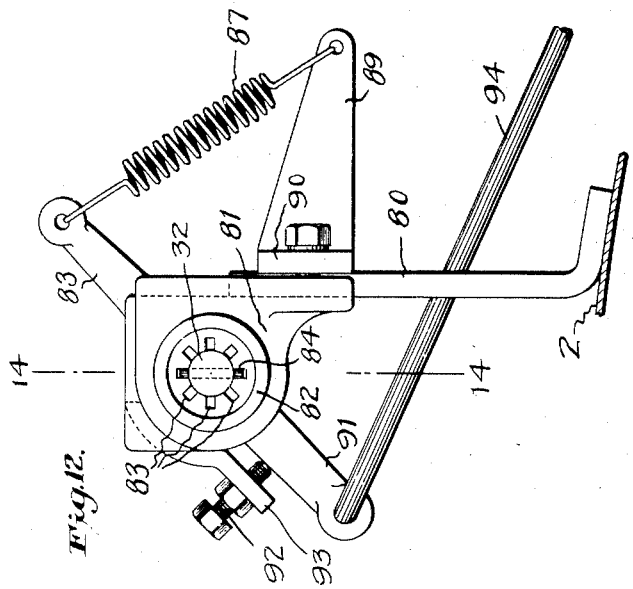
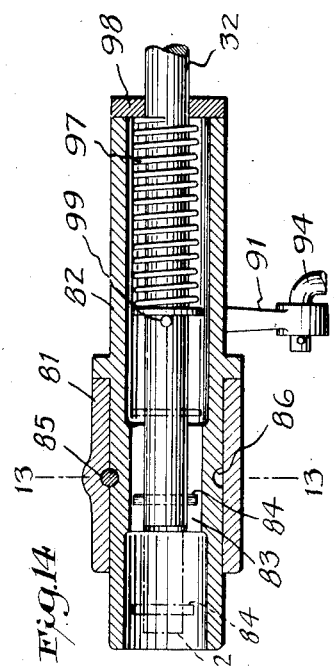

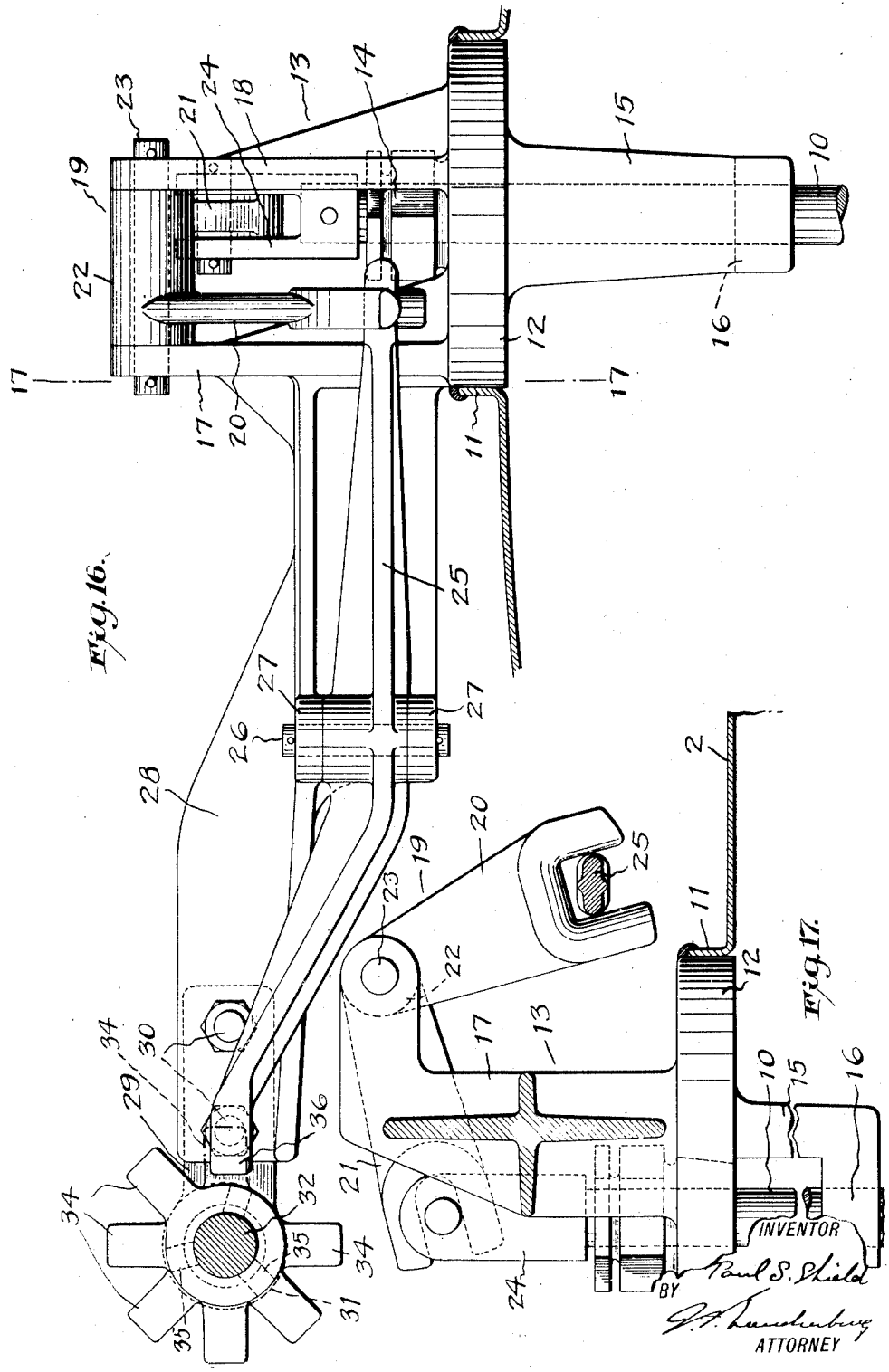

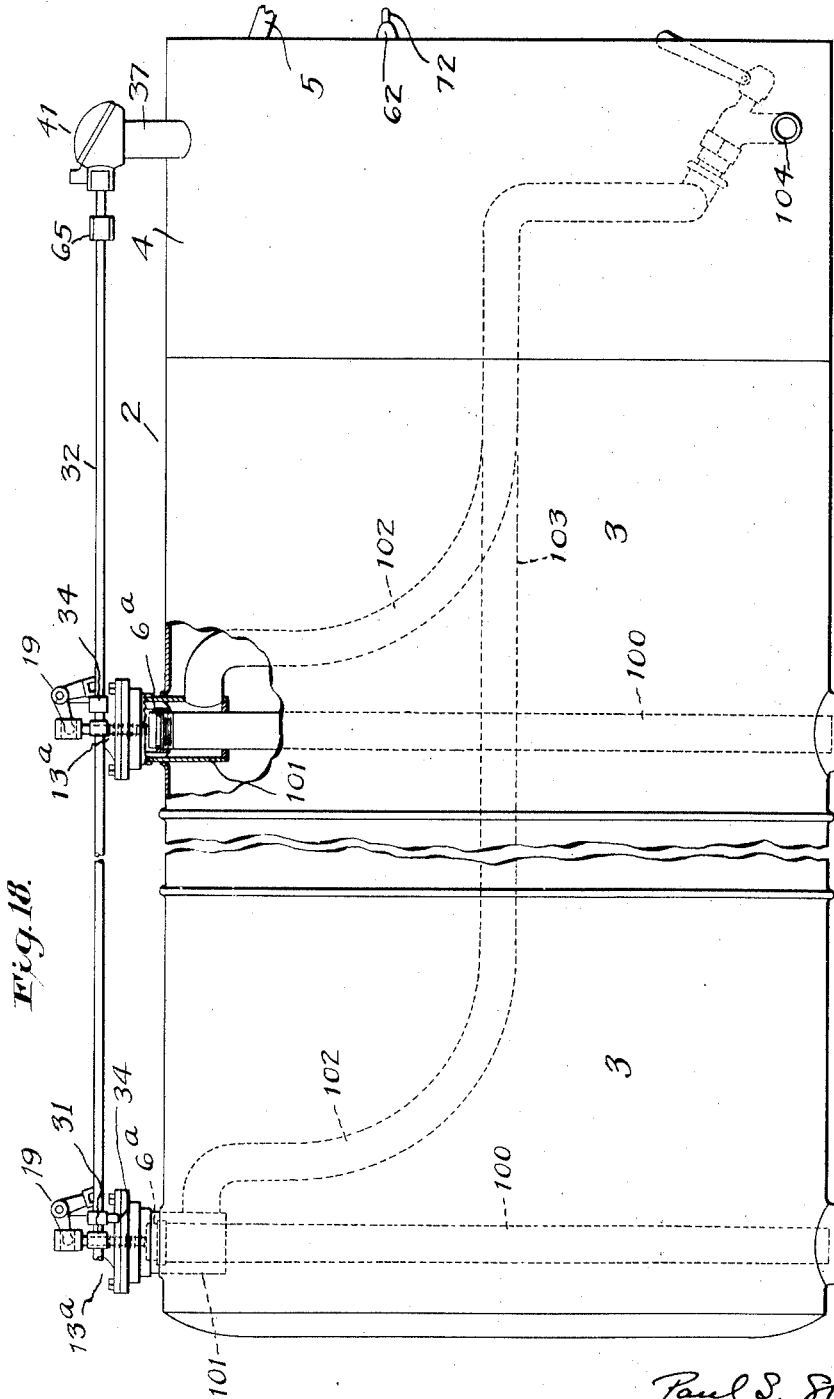

Patented Feb. 16, 1932

1,845,817

UNITED STATES PATENT OFFICE

PAUL S. SHIELD, OF CINCINNATI, OHIO, ASSIGNOR TO AUGUSTINE DAVIS, JR., OF CINCINNATI, OHIO

SELECTIVE SAFETY TANK VALVE MECHANISM

Application filed March 20, 1926. Serial No. 96,235.

The invention relates to valve mechanism, and especially to safety tank valve mechanism for vehicle tanks used to transport and make deliveries of inflammable or explosive liquids such as gasoline. The purpose of the invention is to provide a mechanical selective multiple-control mechanism, of simple, strong, reliable and efficient character, including also automatic fire and emergency front-end release features. The invention comprises various parts, improvements and combinations which will be best understood from the following description and which will be particularly pointed out in the claims.
In the accompanying drawings forming part hereof:

Fig. 1 is a side elevation of a multiple-compartment vehicle tank having the customary box at the rear, a portion of the side and top walls of the box being broken away to show parts within, the door of the box being indicated in a partly open position and broken away, and a large part of the tank and its compartments and the corresponding portion of the control rod being broken out and portions being brought into proximity for economy of space;

Fig. 2 is a plan view corresponding to Fig. 1;
Fig. 3 is an enlarged vertical section of parts at the rear end, certain of the portions being seen in elevation;

Fig. 4 is a cross-section on the line 4—4 of Fig. 3;

Fig. 5 is a horizontal section on the line 5—5 of Fig. 3;

Fig. 6 is a vertical section through the parts shown in Fig. 3, looking at right angles to that view;
Fig. 7 is a horizontal section on the line 7—7 of Fig. 6;

Fig. 8 is a fragmentary elevation of lower parts seen in Figs. 3 and 6;

Fig. 9 is a plan view looking at the rear end, with a portion of the actuating handle in section, the tank and the bucket-box not being shown;

Fig. 10 is a fragmentary sectional plan view taken on the line 10—10 of Fig. 3;

Fig. 11 is a cross-section on the line 11—11 of Fig. 9;

Fig. 12 is a front elevation of parts at the forward end of the control rod, the release rod being broken away and a portion of the tank shell being seen in section;

Fig. 13 is a vertical cross-section through these parts, taken on the line 13—13 of Fig. 14;

Fig. 14 is a vertical longitudinal section taken on the line 14—14 of Fig. 12;

Fig. 15 is a longitudinal section through the sleeve shown in Figs. 12 to 14, taken in the plane of its arms, one of the arms being broken away for lack of space;

Fig. 16 is a sectional elevation taken on the irregular line 16—16 of Fig. 2;

Fig. 17 is a fragmentary section taken on the line 17—17 of Fig. 16; and

Fig. 18 is a side elevation of a vehicle tank with most of the intermediate part of the tank broken out, illustrating the application of the valve mechanism to a different arrangement of valves for a different type of delivery from the tank compartments.

In the several views the mechanism is shown in an actuated condition, with the valve of a selected tank chamber, namely the rear compartment, held open, the valves of the other compartments being closed. The tank 2 is divided into a suitable number of tank compartments or chambers 3. In the particular instance illustrated the tank may be understood to comprise seven separate compartments. It is also well known to make such tank compartments in separate units, assembled upon the vehicle frame or mounting. At the rear end of the series of tank compartments there is a customary box 4, usually termed a bucket-box, this box being utilized to hold equipment and to house operating mechanism. The numeral 5 designates a rear door for the box, this door being partly open.

Fig. 1 illustrates valves 6 in the lower parts of the several compartments commanding bottom outlets to a pipe or pipes 7, which lead rearward and may be understood as being equipped with a customary dispensing faucet or faucets. The valves 6 are of suitable automatic-closing design, closing downwardly upon seats at the bottom outlets under the influence of springs and/or the action of the liquid. The nature of such valves is well understood and does not require special illustration. The stems 8 of the valves are shown flexibly connected by links 9 with pull-rods 10 passing through the tops of the compartments. These rods will be termed, for convenience, valve rods.

Over the position of the valve, the top of the shell of each tank chamber is formed with a flanged opening 11, in which is welded a basal disk 12 of a bracket 13. In each of the disks 12 is a stuffing-box 14 guiding the corresponding valve rod 10 and making a tight joint. Reaching downward into the interior of the tank chamber from the under side of each of the disks 12 is an integral arm 15 having a lateral foot 16 perforated in line with the stuffing-box 14 to provide a lower bearing for the rod 10.

An integral superstructure, comprising two spaced side members 17 and 18, rises from the top of the basal disk 12 of each bracket to support a suspended offset bell-crank rocker 19 consisting of two arms 20 and 21 projecting in angular relation from a hub 22, the said hub being rockable on a pin 23 held in the tops of the side members 17 and 18. The arm 21 of the bell-crank coacts with a clevis 24 on the upper end of the pull-rod 10, while the end of the arm 20 is bifurcated to coact with the inner end of an outboard extending lever 25. Said lever is fulcrumed intermediate its ends on a vertical pin 26 held in upper and lower sub-arms 27 projecting laterally from the middle portion of a strong outboard-extending arm 28, which is formed integral with the side member 17. The outer ends of the several arms 28 carry separate terminal pieces 29, which are secured to the arms in carefully adjusted positions by bolts 30. The terminal pieces 29 are formed with bearing collars 31 for a common control rod 32, which extends lengthwise over the tops of the tank chambers and of the bucket-box. The provision of the separate terminal pieces 29 enables the numerous bearings at the outer ends of the long arms 28 to be satisfactorily alined with each other and with the mechanisms at the front and rear ends of the tank, to be hereinafter described, notwithstanding inaccuracies in the castings or deflections due to welding the brackets to the tank structure. Springs 33 connected between the levers 25 and the bracket arms 28 act upon these levers in the valve-closing directions, and are desirable for prevention of rattling and looseness.

The common control rod 32 carries a number of dogs or actuating projections 34, one for each valve-operating lever 25, these dogs being adapted to act upon said levers to open the valves 6.

The rod 32 is designed to have two movements or two kinds of movement, that is to say a turning movement and a longitudinal movement, and according to the plan of the invention one of these movements is employed for selecting the valve of any one of the tank chambers for actuation while the other movement serves to effect the actuation or opening of the valve. As specifically designed and illustrated in the drawings, the turning movement is the selective movement and the longitudinal movement of the rod is the actuating movement. The dogs 34 are, therefore, set upon the control rod by means of screws 35 in different relative angular positions. The seven dogs (assuming that to be the number of tank chambers) are seen in end view in Fig. 16 radiating at equal angular intervals, with a vacant space, which is provided for a purpose which will be explained. The position of one of the dogs in this view is indicated in dotted lines, this being the rearmost dog, which is behind the plane of the section. Under different conditions the dogs may be spaced and arranged in a different manner. It may be understood that the free outer ends 36 of the levers 25 lie in alinement lengthwise of the tank, so that the position occupied by the dotted line dog of Fig. 16 is the operative position for any of the dogs.

The selecting and actuating means at the rear end of the tank will now be described.

A vertical tubular casing 37 extends through the top wall of the bucket-box 4, to which it is welded or otherwise secured, the lower portion of this tube being held by a collar 38 on the upper arm of a bifurcated bracket 39 fixed to a support in the bucket-box. The tubular stem 40 of a top housing 41 is fixed in the upper end of the tube 37, and the tubular body of a stationary selector plate 42 is fixed in the lower end of said tube. A vertical tubular shaft 43 passes upward through the interior of the tubular casing 37, the upper end of this shaft being pinned to the hub 44 of a segmental bevel gear element 45. The said hub 44 has rotary bearing in the tubular part 40, and the element 45 resting on the floor of the top housing 41 supports the shaft 43, the lower end of said shaft having lateral bearing in the member 42. The under face of the member 42 is provided with a series of locking sockets 46 arranged on the circumference of the circle, there being one socket for each of the seven dogs 34, plus an extra zero or resetting socket. The corresponding positions are marked upon the exposed periphery of a turnable selector disk 47, while an index mark 47ª is placed upon the exposed periphery of the stationary member 42, as seen in Fig. 8.

The selector member 47 is turned by a handle 48, slidably fitted in a socket 49 on the member, and retained and limited in its movement in and out by pins 50 entering a recess 51 in the handle. A sloping-sided groove or notch 52 in the handle is provided to coact with a locking plunger 53, movable in a hole in the member 47, in a direction parallel with the rotational axis of the member. A spring 54 within the handle 48 and socket 49 normally presses the handle to its outer limit of longitudinal movement, in which position the plunger 53 is sustained by the side of the handle in positive locking engagement with one of the notches 46 in the disk 42. This holds the turnable shaft 43 and parts operated thereby in one or another predetermined position. Pushing the handle inward preparatory to turning brings the groove 52 into registry with the locking plunger, so that the latter may recede from the notch 46.

The segmental gear element 45 heretofore referred to meshes with a smaller bevel gear element 55 having a tubular hub 56 which is rotatable in a horizontal bearing at the front of the housing 41. For greater accuracy and security this hub may be provided with a circumferential series of notches 57, corresponding to the notches 46, to cooperate with a spring-pressed, non-positive locking plunger 58.

The turnable element 55 encircles the rear end of the control rod, which it is adapted to turn by the coaction of longitudinal slots 59 in the hollow element and a transverse pin 60 in the rod. This connection nevertheless permits the control rod to be moved in the longitudinal direction by the actuating means to be described. In the normal condition, with the control rod held forwardly, the ends of the pin 60 are in the slots 59, establishing the operating connection, but when the rod has been shifted rearward to open a selected valve the pin 60 is carried out of the slots, as seen in Fig. 3, to a position enabling the pin and the rod to be turned for a purpose hereinafter explained, free of the member 55, which is held locked.

The means for moving the horizontal control rod 32 longitudinally includes a vertical rock-shaft 61, coaxial with the tubular shaft 43, through which it passes. The lower end of this shaft 61 has a further bearing in the lower arm of the bracket 39, which supports a hand lever 62 and thereby the shaft to which the lever is secured.

The upper end of said shaft carries a crank-arm 63, which projects through a slot in the housing 41, and is connected by a link 64 with a yoke 65 encircling the control-rod 32 and guided on a fixed guide-rod 66. Sufficient operating connection between the yoke 65 and the control rod is provided by a transverse pin 67 in the control rod, against the ends of which the yoke will press rearwardly when the handle 62 is moved outwardly of the bucket-box.

The handle 62 is locked in the actuated position, so as to hold the control rod and the opened valve against return movement under the action of the valve spring, by means of a plunger 68 guided for movement longitudinally of the lever 62 in the forward part thereof, this plunger shooting behind a pin 69 rising from the bracket. The plunger is connected by a two-armed lever 70 with a rod 71 passing longitudinally of the lever, through a bore in the handle portion thereof. A projecting button 72 on the rear end of this rod is pushed inward to retract the plunger 68, against pressure of a spring 73 in the handle which urges the parts so as to project the locking plunger.

A spring 74 of superior efficacy to the spring 73 encircles the forward part of the rod 71, but is restrained against acting upon a projection 75 on the rod by an abutment 76. This abutment, advantageously made of a piece of stout wire bent into general U-shape, is fulcrumed at one side of the rod in a recess 77 in the lever 62, and at the other side of the rod is sustained by a fusible link 78 connecting the abutment with a portion of the lever. If the button 79 of low-fusing metal in the link is melted, the abutment is thrown out of the way by the spring 74, which acts upon the projection 75 so as to project the rod 71 forwardly, thereby retracting the locking plunger 68, permitting the opened valve to close.

The foregoing feature provides for automatic closing of the valve in case of fire at the rear end of the tank vehicle. It is also important to provide a special manually operated closing release at the front end, to be operated in case of an emergency when it may be difficult to get at the handle 62 at the rear end, or when this handle may be jammed as the result of a rear-end collision, for example. For this purpose the following device is provided.

A bracket 80 is secured to the forward and upper part of the tank-shell, and has clamped to it a horizontal bearing 81 for a turnable sleeve 82, which encircles the forward end of the control rod 32. This sleeve is preferably counterbored from both ends to form enlarged chambers, and the intermediate interior portion is broached with a plurality of longitudinal key-ways 83, corresponding in number to the number of valves to be opened, plus one. That is to say there is the same number of key-ways 83 as there are locking notches 46 in the selector in the rear end bucket-box. It is perhaps not strictly informing to say that there are as many key-ways or notches as there are valves, plus one, because for convenience of manufacture these parts might all be made to work with a maximum number of valves, and could of course be used with a tank having a lesser number of compartments and valves.

The key-ways 83 are to coact with the ends of a cross-pin or key 84 in the rod 32, the relations being such that the key occupies a pair of the key-ways when the control rod 32 is in the rearward position, while when the mechanism is in normal condition with all valves closed, the key pin is carried out of engagement with the slotted portion of the sleeve, so that then the rod may be turned independently of this sleeve.

Figs. 3 and 14 show the rear and front ends of the control rod 32 in the positions which they assume when this rod has been drawn rearward to open a valve. The front end of the rod with its key 84 is seen to be in engagement with key-ways 83 of the turnable sleeve 82, while the key 60 is out of engagement with the key-ways 59 of the turnable part 56. Dotted lines in these same views show the forward position of the rod, that is to say the position occupied by its front and rear ends when all valves are closed. In that condition the rear end of the rod is engaged with the rear member 55, 56, so that the rod may be turned by this member, while the forward end of the rod is out of interlocking engagement with the forward turning member 82. The sleeve 82 is held against longitudinal movement in the bearing 81 by a pin 85 in the bearing tangential to a circumferential groove 86 in the sleeve. The sleeve is normally held in a definite position with respect to rotation, by a spring 87 connected to an arm 88 on the sleeve and to an arm 89 projecting from a clamping piece 90 secured to the bearing. This spring holds another arm 91 on the sleeve against an adjustable stop screw 92 carried by a bracket 93 projecting from the bearing.

A pull-rod 94 connected to the arm 91 passes downward and outward, through a guide bracket 95 on the side of the tank, and is provided with a handle 96.

A spring 97 inside the rear chamber of the sleeve 82 and bearing at its opposite ends against the rear end 98 of the sleeve and a cross-pin 99 in the control rod 32, is contracted when the control rod is drawn rearward and exerts an effort to restore the rod to its normal, forward position.

The operation will be briefly described. The operator wishes to make a delivery from one of the tank chambers, say the rearmost chamber, which may be number 1 or number 7, or whatever the number may be. He opens the door of the bucket-box, grasps and pushes inward on the handle 48, thereby unlocking the selector lock. He then turns this handle until the selector indicator shows the proper number. On letting go of the handle, the spring 54 acts to lock the selector and the parts operated thereby in the selected position. The turning of the selector turned the hollow vertical shaft 43 and the member 55, 56 geared at right angles thereto. The elements 59, 60 being in engagement, the control rod 32 was also turned, so as to bring one of the dogs 34 into alinement with the end of the valve-operating lever 25 of the selected compartment.

The next operation is to turn the lever 62 so as to rock the shaft 61, and, through the linkage at the upper end, pull the control rod rearward, causing the selected dog 34 to encounter and swing the selected lever 25, thereby opening the selected safety valve 6. The parts are locked in this position by the locking plunger 68 on the actuating lever taking behind the stationary part 69, holding the valve open against the action of its spring and the tendency of the liquid to close it.

The rearward or valve-opening movement of the control rod carried its keyed rear end out of interlocking engagement with the member 55, 56, and at the same time brought its keyed front end into interlocking engagement with the slotted sleeve member 82. In case of special emergency, therefore, the opened valve may be caused to close by pulling on the handle 96 of the rod 94. This rocks the sleeve 82, thereby rocking the control rod 32 so as to carry the active dog 34 away from its valve lever 25, whereupon this valve closes. As soon as the handle 96 is released, the control rod and the dogs 34 are turned back to the positions which they previously occupied. Consequently, the particular dog 34 would be in line with the contact end 36 of the corresponding valve lever, but in rear of it. In order to restore the normal condition, it is therefore necessary to unlock the selector and turn it to the zero or resetting position, in which none of the dogs 34 is in line with any of the levers 25. Thereupon, the spring 97 at the forward end of the control rod will return this rod to its full forward position.

The action of the fusible or thermal release has been described. Suffice it to say, that in case of a fire at the rear end of the tank truck when a valve is open, the fusible element 79 of the link 78 will melt at about 160°, thereby freeing the unlocking spring 74, which releases the rock-shaft 61 and the control rod 32 connected therewith, so that the valve will shut.

Fig. 18 illustrates an application of the mechanism to a tank which, instead of bottom outlets, has a siphon discharge arrangement from the several chambers. In each of the chambers there is a vertical pipe or inlet leg 100 extending upward from a pocket in the bottom of the chamber to the upper part, where it is provided with a valve-seat for one of the downwardly seating valves 6$^a$. The valve-seated upper end of the pipe 100 and the valve 6$^a$ are inside a box 101, forming an enlargement in the siphon, and from each of the boxes 101 a pipe 102 extends downward to a manifold 103 extending rearward and having its valved end 104 in the lower end of the bucket-box. When a hose is attached to this end and inserted into the inlet of an underground tank, a siphon having multiple inlet legs is completed.

The top brackets 13ª in this case are applied as caps to the protruding tops of the boxes 101, and are generally similar to the brackets 13 heretofore described.

The illustrated embodiments of the invention have been described in detail, in order to give a clear understanding of the invention in its present contemplated applications. It will be understood that numerous changes may be made in form, proportion, arrangement and details, and by way of omission, amplification and reversal, such as will naturally suggest themselves to the skilled mechanic, without departing from the essentials set forth in the appended claims.

What I claim as new is:

1. In combination with a number of tank chambers and valve devices pertaining to said chambers, a control rod movable both lengthwise and turnably, and instrumentalities set in different relative positions along said rod, whereby one movement of the rod serves to select a valve device for actuation while the other movement causes the actuation, coaxial independently turnable operating shafts, means operatable by one of said shafts for turning the control rod, and means operatable by the other of said coaxial shafts for moving said rod longitudinally.

2. In combination with a number of tank chambers and valve devices pertaining to said chambers, a control rod movable both lengthwise and turnably, and instrumentalities set in different relative positions along said rod, whereby one movement of the rod serves to select a valve device for actuation while the other movement causes the actuation, coaxial independently turnable operating shafts, a turnable connection operatable by one of said shafts for turning the control rod, said connection adapted to permit the control rod to move longitudinally with respect thereto, and a connection operatable by the other of said shafts for moving the control rod longitudinally relatively to the aforesaid connection.

3. In combination with a number of tank chambers and valve devices pertaining to said chambers, a control rod movable both lengthwise and turnably, and instrumentalities set in different relative positions along said rod, whereby one movement of the rod serves to select a valve device for actuation while the other movement causes the actuation, a hollow turnable vertical operating shaft with means for turning the same, a toothed gear element on the upper end of said shaft, a hollow toothed element encircling said control rod and meshing the first-named toothed element, means whereby the second named toothed element can turn the control rod yet permit the control rod to move longitudinally therein, a second turnable vertical operating shaft passing through the hollow shaft, and linkage operatable by said second shaft for moving said control rod longitudinally.

4. In combination with a number of tank chambers and valve devices pertaining to said chambers, a control rod movable both lengthwise and turnably, and instrumentalities set in different relative positions along said rod, whereby one movement of the rod serves to select a valve device for actuation while the other movement causes the actuation, vertical coaxial independently turnable operating shafts, means operatable from the upper part of one of said shafts for turning the control rod, means operatable from the upper part of the other shaft for moving the control rod longitudinally, a selector connected with the lower part of one shaft having a series of definite positions, and an actuating lever connected with the lower part of the other shaft.

5. In combination with a number of tank chambers and valve devices pertaining to said chambers, a control rod movable both lengthwise and turnable, and instrumentalities set in different relative positions along said rod, whereby one movement of the rod serves to select a valve device for actuation while the other movement causes the actuation, a turntable indicating selector having operative connection with said control rod, a cooperative stationary selector member containing a series of sockets, a locking element carried by the turnable selector and movable therein parallel with the axis of rotation to coact with said sockets, a lever handle on the selector for turning the same, said handle being movable lengthwise in the selector and having a portion to cooperate with said locking element, and means urging said handle lengthwise in the direction to lock said locking element in one or another of said sockets.

6. In combination with tank-valve mechanism, a lever for operating said valve mechanism, a movable locking device on said lever for locking the lever in operated position, a spring urging said locking device to locking position, a spring of superior efficacy adapted to move the locking device in the unlocking direction, and readily fusible means restraining said superior spring.

7. In combination with tank-valve mechanism, a lever for operating said valve mechanism, a locking device on said lever including a rod movable longitudinally of the lever, a spring urging said rod in one direction, a spring of superior efficacy about another portion of said rod adapted to move said rod in the contrary direction, a retaining abutment for the superior spring fulcrumed at one side of the rod on said lever, and a fusible link tying said abutment to the lever, at the other side of said rod.

8. In combination with a number of tank chambers and valve devices pertaining to said chambers, a control rod movable both lengthwise and turnably, and instrumentalities set in different relative positions along said rod, whereby one movement of the rod serves to select a valve device for actuation while the other movement causes the actuation, selecting and actuating means operatively connected with the rear portion of said rod for operating the same in the manner described, and a device operatively related to the forward part of the control rod so as to be capable of moving the rod while the same remains in actuated position, in order to release the actuated valve device.

9. In combination with a number of tank chambers and valve devices pertaining to said chambers, a control rod movable both lengthwise and turnably, and instrumentalities set in different angular positions along said rod, whereby turning the rod to different degrees selects one or another of the valve devices for actuation, while subsequent longitudinal movement of the rod causes the actuation, selecting and actuating means operatively related to the control rod for first turning and then longitudinally moving the same, and a releasing device operatively related to another portion of the rod so as to be capable of turning the rod while the same remains in actuated position, in order to disengage the actuated valve device 10. In combination with a number of tank chambers and valve devices pertaining to said chambers, a control rod movable both lengthwise and turnably, and instrumentalities set in different angular positions along said rod, whereby turning the rod to different degrees selects one or another of the valve devices for actuation, while subsequent longitudinal movement of the rod causes the actuation, means for turning and means for longitudinally moving said rod for the purposes specified, the means for turning the control rod being of such nature that the cooperative portion of the rod is moved into and out of operative engagement therewith by the longitudinal movement of the rod, and releasing means cooperative with another portion of the rod to turn the same, the relations being such that the longitudinal movement shifts the control rod into and out of operative relation to the two turning means in alternation, the rod being out of engagement with one of said means, when it is in engagement with the other, and vice-versa.

11. In combination with a number of tank chambers and valve devices pertaining to said chambers, a control rod movable both lengthwise and turnably, and instrumentalities set in different angular positions along said rod, whereby turning the rod to different degrees selects one or another of the valve devices for actuation, while subsequent longitudinal movement of the rod causes the actuation, means for turning and means for longitudinally moving said rod for the purposes specified, the means for turning the control rod being of such nature that the cooperative portion of the rod is moved into and out of operative engagement therewith by the longitudinal movement of the rod, and releasing means cooperative with another portion of the control rod having a projection, said means comprising a sleeve containing a number of slots to receive said projection, said slots corresponding in relative position to the selective positions to which the control rod may be turned.

12. In combination with a number of tank chambers and valve devices pertaining to said chambers, a control rod movable both lengthwise and turnably, and instrumentalities set in different angular positions along said rod, whereby turning the rod to different degrees selects one or another of the valve devices for actuation, while subsequent longitudinal movement of the rod causes the actuation, means for turning and means for longitudinally moving said rod for the purposes specified, the means for turning the control rod being of such nature that the cooperative portion of the rod is moved into and out of operative engagement therewith by the longitudinal movement of the rod, and releasing means cooperative with another portion of the control rod having a projection, said means comprising a sleeve containing a number of slots to receive said projection, said slots corresponding in number and relative position to the instrumentalities on the rod plus one.

13. In combination with a number of tank chambers and valve devices pertaining to said chambers, a control rod movable both lengthwise and turnably, and instrumentalities set in different angular positions along said rod, whereby turning the rod to different degrees selects one or another of the valve devices for actuation, while subsequent longitudinal movement of the rod causes the actuation, and a selector for turning said rod having a number of predetermined positions corresponding to the instrumentalities on the rod, plus a resetting position.

14. In combination with a number of tank chambers and valve devices pertaining to said chambers, a control rod movable both lengthwise and turnably, and instrumentalities set in different angular positions along said rod, whereby turning the rod to different degrees selects one or another of the valve devices for actuation, while subsequent longitudinal movement of the rod causes the actuation, a selector for turning said rod having a number of predetermined positions corresponding to the instrumentalities on the rod, plus a resetting position, and releasing means adapted to turn the control rod while the same is in actuated position, in order to release the actuated valve device.

15. In tank-valve mechanism, a series of brackets mounted along the top of the tank, vertical valve rods passing through said brackets, rockers mounted on horizontal axes on the upper parts of the brackets and having arms in angular relation, one arm of each rocker coacting with the corresponding valve rod, rigid arms projecting outboard from the several brackets, bearings carried on the outer ends of said arms, a longitudinal control rod mounted in the bearings of the several arms and carrying actuating projections, and levers fulcrumed intermediate their ends on said arms, their outer ends to be acted upon by said projections and their inner ends to act upon the other arms of said rockers.

16. In tank-valve mechanism, a series of brackets mounted along the top of the tank, vertical valve rods passing through said brackets, rockers mounted on horizontal axes on the upper parts of the brackets and having arms in angular relation, one arm of each rocker coacting with the corresponding valve rod, rigid arms projecting outboard from the several brackets, separate terminals fixed in adjusted position on the outer ends of said arms and presenting alined bearings, a longitudinal control rod mounted in the bearings of the several arms and carrying actuating projections, and levers fulcrumed intermediate their ends on said arms, their outer ends to be acted upon by said projections and their inner ends to act upon the other arms of said rockers.

PAUL S. SHIELD.